US007959992B2

(12) United States Patent
Chen

(10) Patent No.: US 7,959,992 B2
(45) Date of Patent: Jun. 14, 2011

(54) POROUS INKJET RECORDING MATERIAL COMPRISING A SILANE COUPLING AGENT

(75) Inventor: Tienteh Chen, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 521 days.

(21) Appl. No.: 11/483,289

(22) Filed: Jul. 6, 2006

(65) Prior Publication Data

US 2008/0008882 A1 Jan. 10, 2008

(51) Int. Cl.
*B32B 5/16* (2006.01)
*B41M 5/50* (2006.01)

(52) U.S. Cl. ............... 428/32.34; 428/32.21; 428/32.31; 428/32.36; 428/331; 427/203; 427/204; 427/419.2; 427/419.5

(58) Field of Classification Search .................. 428/331, 428/32.21, 32.31, 32.34, 32.36; 427/203, 427/204, 419.2, 419.5
See application file for complete search history.

(56) References Cited

U.S. PATENT DOCUMENTS

| | | | | |
|---|---|---|---|---|
| 4,902,568 | A * | 2/1990 | Morohoshi | 428/32.34 |
| 5,723,175 | A * | 3/1998 | Scholz et al. | 427/161 |
| 6,228,475 | B1 | 5/2001 | Chu et al. | |
| 6,861,115 | B2 | 3/2005 | Morris et al. | |
| 6,866,366 | B2 | 3/2005 | Sasaki et al. | |
| 6,890,610 | B2 * | 5/2005 | Bringley et al. | 428/32.36 |
| 6,905,729 | B2 * | 6/2005 | Wickramanayake | 427/180 |
| 7,297,382 | B2 * | 11/2007 | Van Aert et al. | 428/32.26 |
| 7,449,217 | B2 * | 11/2008 | Wickramanayake et al. | 427/333 |
| 2003/0175451 | A1 | 9/2003 | Wickramanayake et al. | |
| 2004/0219311 | A1 | 11/2004 | Wickramanayake et al. | |

FOREIGN PATENT DOCUMENTS

| | | | |
|---|---|---|---|
| EP | 1344654 | A1 | 9/2003 |
| EP | 0983867 | B1 | 10/2004 |
| JP | 59-192589 | | 10/1984 |
| JP | 60-224580 | | 11/1985 |
| JP | 61-134290 | | 6/1986 |
| JP | 62-178384 | | 5/1987 |
| JP | 62-278081 | | 12/1987 |
| JP | 01-160675 | | 6/1989 |
| JP | 01-241486 | | 9/1989 |
| JP | 01-258980 | | 10/1989 |
| JP | 01-281982 | | 11/1989 |
| JP | 11-129611 | | 10/1997 |
| JP | 10-195276 | | 7/1998 |
| JP | 11-322325 | | 11/1999 |
| JP | 2000-233572 | | 8/2000 |
| JP | 2001-010202 | | 1/2001 |
| JP | 2001-277698 | | 10/2001 |
| JP | 2002-347334 | | 12/2002 |
| JP | 2004-001494 | | 4/2003 |
| JP | 2003-266931 | | 9/2003 |
| JP | 2005-169706 | | 12/2003 |
| WO | WO 01-05599 | A1 | 1/2001 |

OTHER PUBLICATIONS

Hahn, R.; Improved surfaces using nano-structured materials: developments from Degussa AG Aerosil und Silanes; paper; 2005; PIRA (Abstract Only).

* cited by examiner

*Primary Examiner* — H. (Holly) T Le

(57) ABSTRACT

An ink receiving substrate includes a substrate layer and organic modified silica dispensed on at least one surface of the support layer, wherein the organic modified silica includes inorganic particulates and silane coupling agents having guanidine or biguanidine functional groups.

22 Claims, 4 Drawing Sheets

POROUS INKJET RECORDING MATERIAL COMPRISING A SILANE COUPLING AGENT

BACKGROUND

Inkjet printing has become a popular way of recording images on various media surfaces, particularly paper, for a number of reasons, including, low printer noise, capability of high-speed recording, and multi-color recording. Additionally, these advantages of inkjet printing can be obtained at a relatively low price to consumers. Though there has been great improvement in inkjet printing, improvements are followed by increased demands from consumers for higher speeds, higher resolution, full color image formation, increased stability, etc.

In recent years, as digital cameras and other digital image collecting devices have advanced, image recording technology has attempted to keep pace by improving inkjet image recording on paper sheets and the like. The desired quality level of the inkjet recorded images ("hard copy") is that of traditional silver halide photography. In other words, consumers would like inkjet recorded images that have the color reproduction, image density, gloss, etc. that is as close to those of silver halide photography as possible.

Ink-jet inks typically comprise an ink vehicle and a colorant, the latter of which may be a dye or a pigment. Dye-based ink-jet inks used in photographic image printing typically include water-soluble dyes.

For ink-jet inks, print media surfaces play a key role in the overall image quality, water resistance, and permanence of the ink-jet produced printed images. Inkjet recording materials designed for dye based inks can generally be separated into two broad groups: porous media and swellable media.

During printing on a porous media, ink is quickly adsorbed onto the surface which is porous in nature, and if an ionic binding species is present, the colorant can be attracted to the ionic species of opposite charge. Upon printing on swellable media, ink is absorbed as water contacts and swells a polymer matrix of the coating. The colorant, which is typically a dye, can be immobilized inside the continuous layer of the polymer with significantly limited exposure to the outside environment.

SUMMARY

An ink receiving substrate includes a support layer and organic modified silica dispensed on at least one surface of the support layer, wherein the organic modified silica includes inorganic particulates and silane coupling agents having guanidine or bi-guanidine functional groups.

BRIEF DESCRIPTION OF THE DRAWINGS

The accompanying drawings illustrate various embodiments of the present system and method and are a part of the specification. The illustrated embodiments are merely examples of the present system and method and do not limit the scope thereof.

Throughout the drawings, identical reference numbers designate similar, but not necessarily identical, elements.

DETAILED DESCRIPTION

Figure 1:
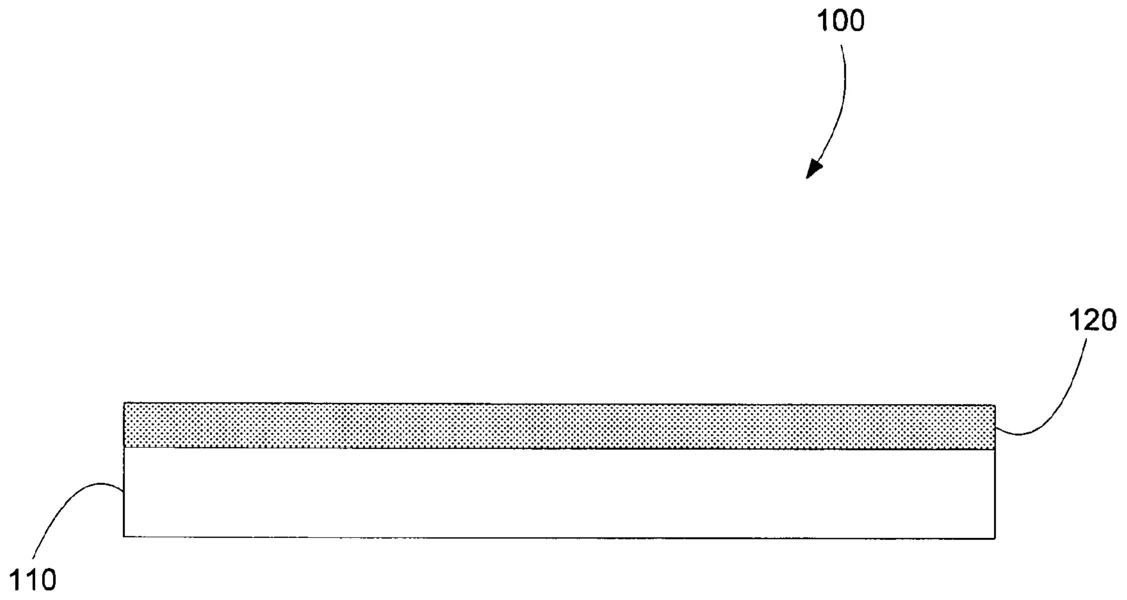
FIG. 1 is a side cross-sectional view illustrating the layers of a porous inkjet recording substrate, according to one exemplary embodiment.

Before particular embodiments of the present system and method are disclosed and described, it is to be understood that the present system and method are not limited to the particular process and materials disclosed herein as such may vary to some degree. It is also to be understood that the terminology used herein is used for the purpose of describing particular embodiments only and is not intended to be limiting, as the scope of the present system and method will be defined only by the appended claims and equivalents thereof.

In describing and claiming the present exemplary system and method, the following terminology will be used.

The singular forms "a," "an," and "the" include plural referents unless the context clearly dictates otherwise. Thus, for example, reference to "a dye" includes reference to one or more of such materials.

"Media substrate" or "substrate" includes any substrate that can be coated for use in the ink-jet printing arts including, but in no way limited to, resin coated paper (so-called photo base paper), papers, overhead projector plastics, coated papers, fabric, art papers (e.g. water color paper), and the like.

"Porous media" refers to any substantially inorganic particulate-containing coated media having surface voids and/or cavities capable of taking in the ink-jet inks in accordance with embodiments of the present invention. Typically, porous media includes a substrate and a porous ink-receiving layer. As ink is printed on the porous media, the ink can fill the voids and the outermost surface can become dry to the touch in a more expedited manner as compared to traditional or swellable media. Common inorganic particulates that can be present in the coatings include metal oxide or semi-metal oxide particulates, such as silica or alumina. Additionally, in accordance with embodiments of the present system and method, the coating can optionally be bound together by a polymeric binder, and can optionally include ionic binding species that are attractive of classes of predetermined dye species.

Similarly, a "porous media coating" typically includes inorganic particulates, such as silica particulates, bound together by a polymeric binder. Optionally, other additives can also be present. The composition can be used as a coating for various media substrates, and can be applied by any of a number of methods known in the art. In accordance with one embodiment of the present exemplary system and method, the inorganic particulates are reagent-modified and surface activated.

The guanidine functional groups are defined as formula (1), (2), and (3):

Formula 1

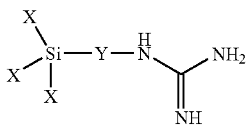

-continued

Formula 2

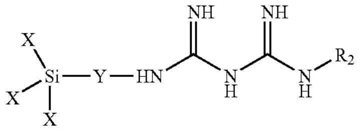

Formula 3

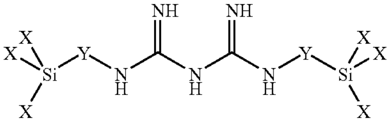

where at least one of X is a halogen, alkoxy, or hydroxyl group configured to attach to the inorganic particulates. Y is a linking group containing from 1 to 20 carbons. Y can be linear or branched hydrocarbons including alkyl, alkylaromatic, substituted aromatic, and can also contain functional groups like ether, urea, urethane, ester, ketone, carbonate, sulfonate, sulfone, and sulfonamide. Y can also be a polyethyleneoxide, a polypropylene oxide, a polyethyleneimine. $R_2$ is hydrogen or $C_1$ to $C_{10}$ alkyl group.

Examples of guanidines and biguanidines silane coupling agents suitable for the present exemplary system and method include, but are in no way limited to those illustrated in Table 1 below:

TABLE 1

Examples of Guanidine and Biguanidine Silane Coupling Agents

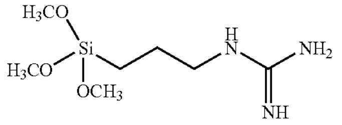

S-1

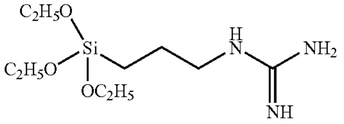

S-2

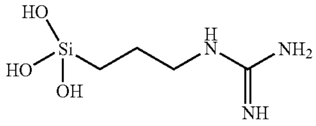

S-3

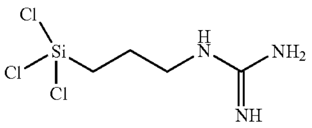

S-4

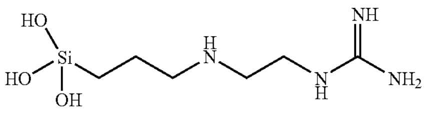

S-5

TABLE 1-continued

Examples of Guanidine and Biguanidine Silane Coupling Agents

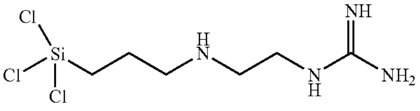

S-6

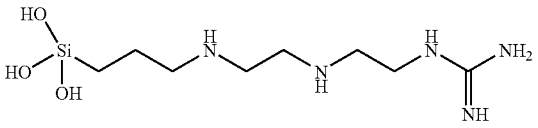

S-7

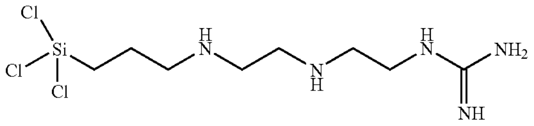

S-8

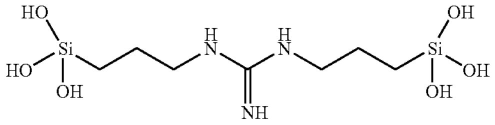

S-9

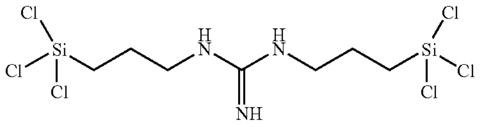

S-10

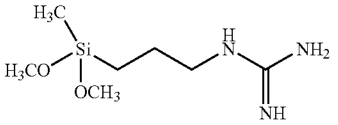

S-11

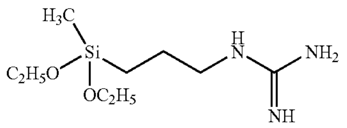

S-12

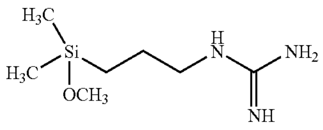

S-13

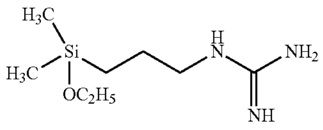

S-14

TABLE 1-continued

Examples of Guanidine and Biguanidine Silane Coupling Agents

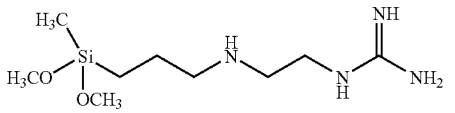
S-15

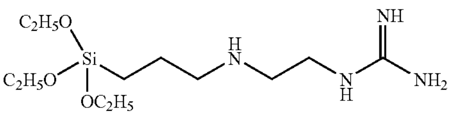
S-16

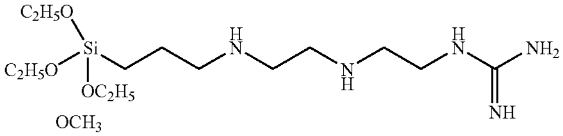
S-17

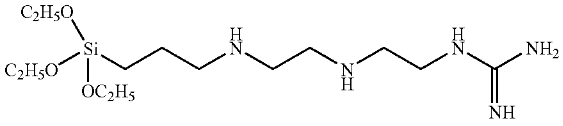
S-18

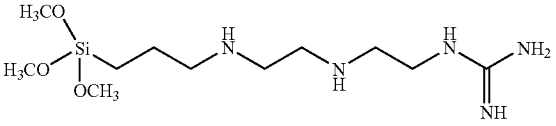
S-19

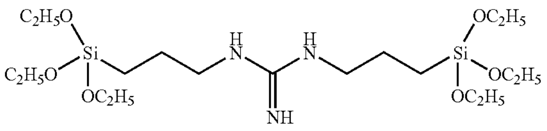
S-20

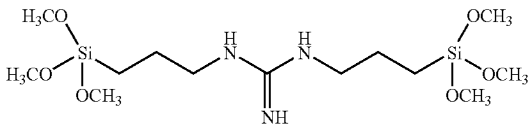
S-21

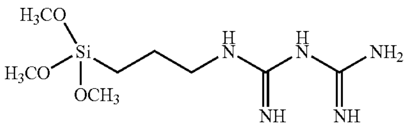
S-22

TABLE 1-continued

Examples of Guanidine and Biguanidine Silane Coupling Agents

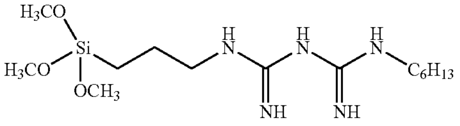
S-23

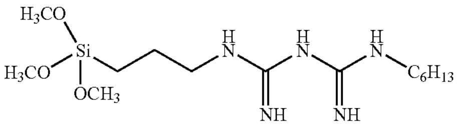
S-24

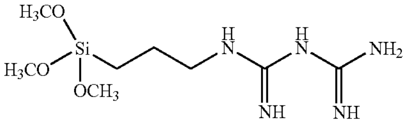
S-25

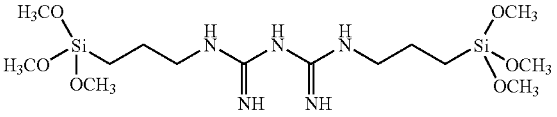
S-26

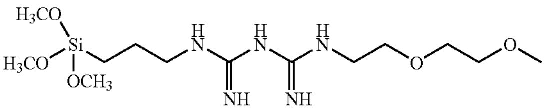
S-27

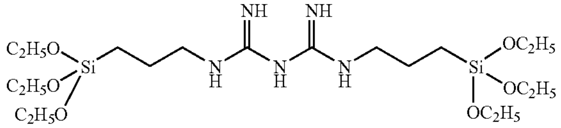
S-28

According to one exemplary embodiment disclosed herein, the porous ink recording material includes organic modified silica prepared by a reaction between a dispersion of fumed silica or alumina and silane coupling agents containing guanidine functional groups. According to the present exemplary system and method, guanidine and biguanidine functional groups include, but are in no way limited to, silane coupling agents with guanidine and/or biguanidine structure. The resulting porous ink recording materials exhibited excellent water fastness, water drip fastness, humid bleed, humid color shift, stacking bleed, stacking color shift, and stacking haze characteristics. Further details of the present ink recording material will be provided below.

According to the present exemplary system and method, the silane coupling agents containing guanidine or biguanidine functional groups can be attached to the surface of metal oxides such as silica and alumina via silane coupling reaction. The reaction between the silane coupling agents containing guanidine functional groups and metal oxides can be carried out in organic solvents, aqueous solution, or the mixture of organic solvent and water. Water is an exemplary reaction medium. Metal oxides can be dispersed in the presence of silane coupling agents containing guanidine functional groups (in-situ method) or the silane coupling agents containing guanidine functional groups can be added to the pre-dispersed metal oxides (post-treated method). A high shear device such as rotor/stator, colloid mill, microfluidizer, homogenizer, et al., can be used to facilitate the dispersion of metal oxides in water. According to one exemplary embodiment image quality is improved when the particle size of the metal oxides is less than approximately 200 nm.

As used in the present specification and in the appended claims, the term "liquid vehicle" is defined to include liquid compositions that can be used to carry colorants, including dyes, to a substrate. Liquid vehicles are well known in the art, and a wide variety of liquid vehicle components may be used in accordance with embodiments of the present exemplary system and method. Such liquid vehicles may include a mixture of a variety of different agents, including without limitation, surfactants, co-solvents, buffers, biocides, viscosity modifiers, sequestering agents, stabilizing agents, and water. Though not liquid per se, the liquid vehicle can also carry other solids, such as polymers, UV curable materials, plasticizers, salts, etc.

The term "active ligand" or "active moiety" includes any active portion of an organosilane reagent that provides a function at or near the surface of inorganic particles present in a porous media coating composition that is not inherent to an unmodified inorganic porous particulate. For example, an active ligand can be used to reduce the use of binder in a porous media coating composition, or can be configured to interact with a dye or other ink-jet ink component, thereby improving permanence. For example, an amine can be present on an organosilane reagent to provide a positive charge to attract an anionic dye of an ink-jet ink.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of approximately 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

In the following description, for purposes of explanation, numerous specific details are set forth in order to provide a thorough understanding of the present system and method for producing an exemplary porous ink recording material having improved image formation qualities. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

FIG. 1 illustrates an exemplary porous ink receiving substrate (100) configured to receive an inkjet ink, according to one exemplary embodiment. As shown in FIG. 1, the present exemplary ink receiving substrate (100) includes a support layer (110) and a porous media coating (120). While the exemplary ink receiving substrate (100) illustrated in FIG. 1 is shown having the porous media coating (120) formed on a single side of the support layer (110), any number of exposed surfaces of the support layer may be coated by the porous media coating. According to one exemplary embodiment, the ink receiving substrate (100) includes a single support layer (110) sandwiched between a plurality of porous media coatings (120), as described herein.

As mentioned with reference to FIG. 1, the present exemplary ink receiving substrate (100) includes a support layer (110) and at least one porous media coating (120). The individual components of the present ink receiving substrate (100) will be described in further detail below.

Photobase Paper

As mentioned previously, the present exemplary ink receiving substrate (100) is formed on a support layer (110) or support. According to one exemplary embodiment, any number of traditional photobase supports used in the manufacture of transparent or opaque photographic material may also be employed in the practice of the present system and method. Examples include, but are not limited to, clear films, such a cellulose esters, including cellulose triacetate, cellulose acetate, cellulose propionate, or cellulose acetate butyrate, polyesters, including poly(ethylene terephthalate), polyimides, polycarbonates, polyamides, polyolefins, poly(vinyl acetals), polyethers, polyvinyl chloride, and polysulfonamides. Polyester film supports, and especially poly(ethylene terephthalate), such as manufactured by du Pont de Nemours under the trade designation of MELINEX, may be selected because of their excellent dimensional stability characteristics. Further, opaque photographic materials may be used as the support layer (110) including, but in no way limited to, baryta paper, polyethylene-coated papers, and voided polyester.

Non-photographic materials, such as transparent films for overhead projectors, may also be used for the support material or the support layer (110). Examples of such transparent films include, but are not limited to, polyesters, diacetates, triacetates, polystyrenes, polyethylenes, polycarbonates, polymethacrylates, cellophane, celluloid, polyvinyl chlorides, polyvinylidene chlorides, polysulfones, and polyimides.

Additional support materials that may be incorporated by the present system and method to serve as the support layer (110) include plain paper of various different types, including, but in no way limited to, pigmented papers and cast-coated papers, as well as metal foils, such as foils made from alumina.

Porous Media Coating

Continuing with FIG. 1, the present exemplary ink receiving substrate (100) includes at least one porous media coating (120). According to the present exemplary embodiment, the at least one porous media coating (120) includes at least one layer of inorganic particles such as fumed silica or alumina treated with silane coupling agents containing silane coupling agents including guanidine and/or biguanidine functional groups.

As mentioned above, the porous media coating (120) includes a number of inorganic particles. According to his exemplary embodiment, the inorganic particles comprise a fumed silica or alumina. According to this exemplary embodiment, the fumed silica may be any silica in colloidal form. Specifically, according to one exemplary embodiment, the aggregate size of the fumed silica is between approximately 50 to 300 nm in size. More specifically, the fumed silica is preferred between approximately 80 to 250 nm in size. The Brunauer-Emmett-Teller (BET) surface area of the fumed silica is between approximately 100 to 400 square meters per gram. More specifically, the fumed silica is preferred to have a BET surface are of 200 to 300 square meters per gram. In addition to the above-mentioned inorganic particulates, the at least one porous media coating (120) includes a silane coupling agent including guanidine and/or biguanidine functional groups.

As previously discussed, silane coupling agent includes compositions that include silane coupling agents having guanidine and/or biguanidine functional groups. The silane grouping of the silane coupling agents including guanidine and/or biguanidine functional groups may be attached to inorganic particulates of the porous media coating composition through hydroxyl groups, halo groups, or alkoxy groups present on the reagent. In addition to the above-mentioned components, the porous media coating (110) may also contain any number of surfactants, buffers, plasticizers, and/or other additives that are well known in the art.

Exemplary Formation Methods

Figure 2:
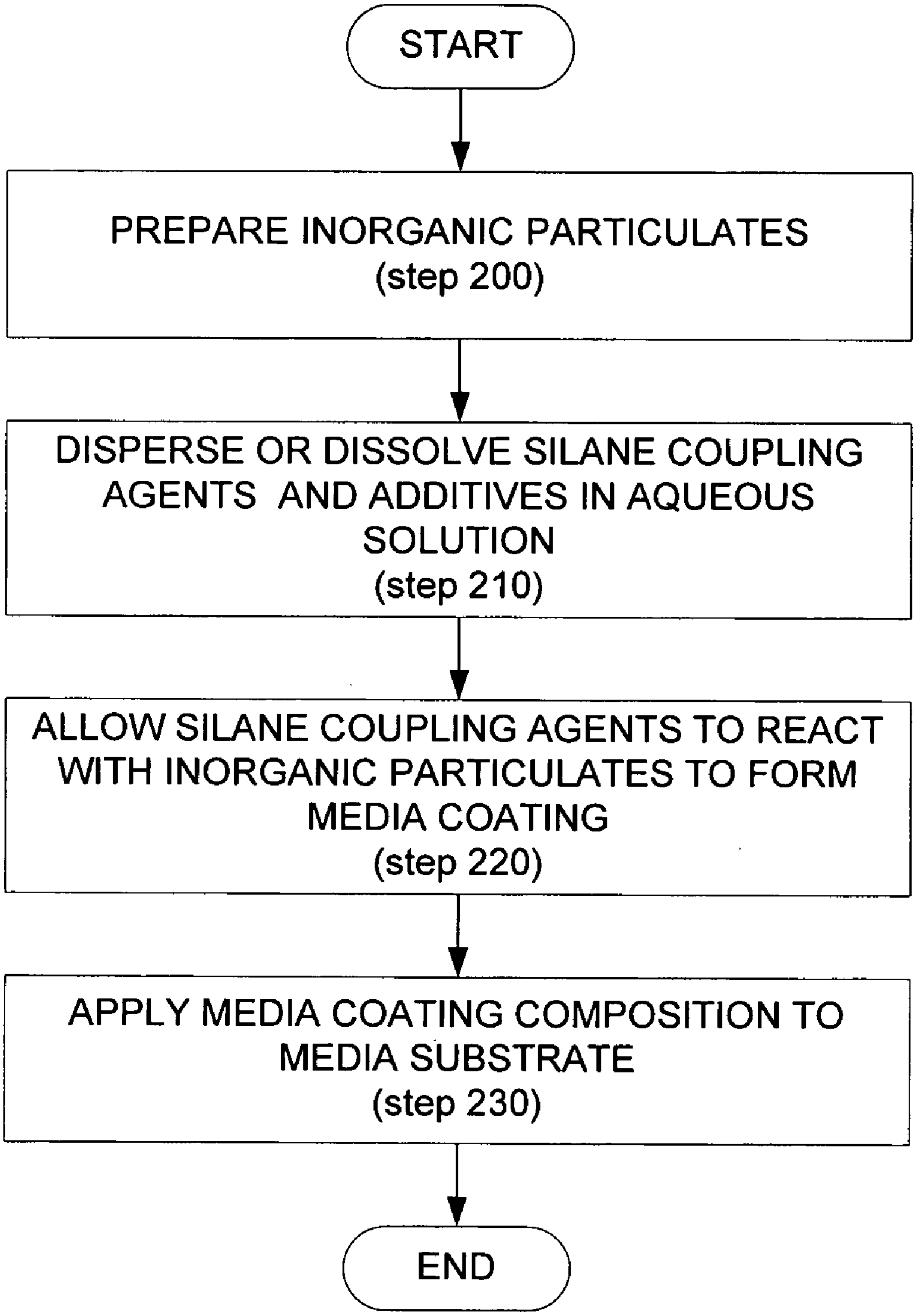
FIG. 2 is a simple block diagram illustrating a method for forming a porous inkjet recording substrate, according to one exemplary embodiment.

FIG. 2 illustrates an exemplary method for forming the present porous inkjet material substrate. While the method presented and described with respect to FIG. 2 is discussed in a particular order, it will be appreciated by one of ordinary skill in the art that a number of the various steps described may be performed simultaneously or in alternate sequences. As illustrated in FIG. 2, the exemplary method for forming the present inkjet material substrate begins by preparing inorganic particulates (step 200). For example, according to one exemplary method, preparing inorganic particulates may include first dispersing or dissolving the inorganic porous particulates in an aqueous solution. As mentioned previously, the inorganic porous particulates may include, but are in no way limited to fumed silica and/or alumina.

Once the inorganic porous particulates are dispersed in the aqueous solution (step 200), the silane coupling agents including guanidine and/or biguanidine functional groups, as well as any desired additives are dispersed in the aqueous solution (step 210). According to one exemplary embodiment of the present system and method, the amount of silane coupling agent used may vary from approximately 0.1to 20 based on the weight of the silica or alumina. A more preferred range of the silane coupling agent used may vary from approximately 0.5 to 15 by weight based on the weight of fumed silica or alumina.

Once the inorganic porous particulates and the silane coupling agents including guanidine and/or biguanidine functional groups are combined in the aqueous solution, they will react to form organic modified silica (step 220). According to one exemplary embodiment, the silane coupling agents are covalently bonded to the inorganic porous particulates when combined in the aqueous solution. According to one exemplary embodiment, the reaction between the silane coupling agents, the inorganic porous particulates, and any other additives such as ACH may be accelerated by heating the resulting mixture to between approximately 50 to 90° C. for approximately 0 to 3 hours.

While the above-mentioned exemplary embodiment is described as selectively combining the inorganic porous particulates and the silane coupling agents in a single aqueous solution to facilitate the reaction, a number of modifications may be made to the described method to produce the present results. According to one alternative exemplary embodiment, the inorganic porous particulates can be dispersed or dissolved separately in water, and then the aqueous silane coupling agents including a guanidine functional group can be mixed together for the reacting step.

Once the silane coupling agents have reacted with the inorganic porous particulates (step 220), the resulting media coating composition may then be applied to a media substrate (step 230). According to one exemplary embodiment, the resulting media coating composition can be applied to the media substrate to form the ink-receiving layer (step 230) by any means known to one skilled in the art including, but in no way limited to, blade coating, air knife coating, rod coating, wire rod coating, roll coating, slot coating, slide hopper coating, gravure, curtain, or cascade coating. The ink-receiving layer can be printed on one or both sides of the media substrate. In one embodiment of the present exemplary method, the thickness of the ink-receiving layer formed by the coating composition can be from about 20 μm to about 60 μm. If applied as a second media topcoat, the thickness can range from 0.1 μm to 10 μm, and in a more specific embodiment, from 1 μm to 5 μm. According to one exemplary embodiment, the coating composition is formed such that the fumed silica is distributed at between approximately 0.01 to 0.03 grams per square meter.

Figure 3:
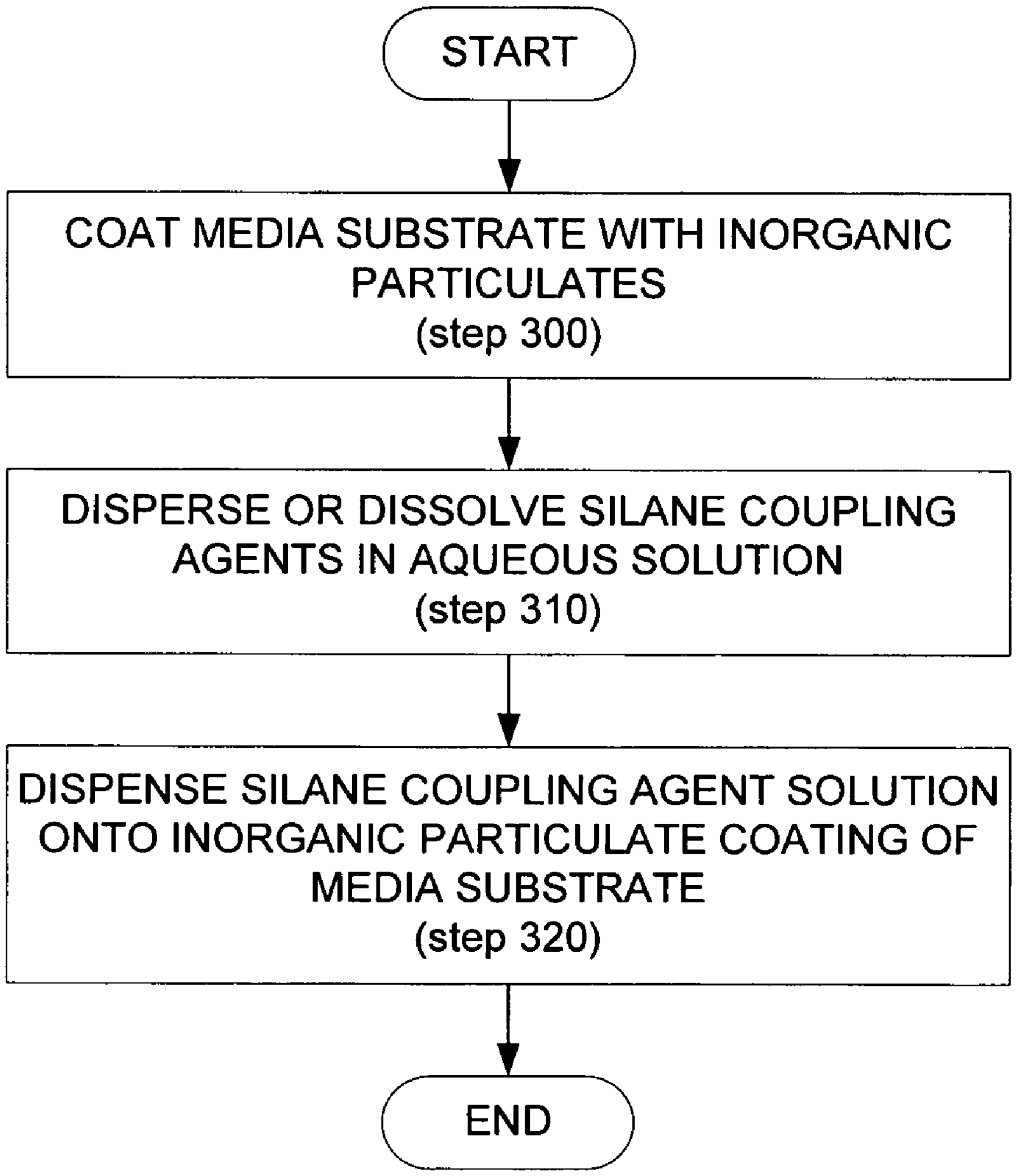
FIG. 3 is a simple block diagram illustrating another method for forming a porous inkjet recording substrate, according to one exemplary embodiment.

FIG. 3 illustrates an alternative exemplary method for forming the present exemplary porous inkjet material substrate. As illustrated in FIG. 3, the present exemplary porous inkjet material substrate may be formed by first coating a media substrate with inorganic porous particulates (step 300), according to known methods. Additionally, as shown in FIG. 3, the silane coupling agents containing guanidine functional groups are dispersed or dissolved in an aqueous solution (step 310) to form a liquid coating composition. The liquid coating composition containing the silane coupling agents may then be dispensed onto the substrate having the inorganic porous particulates formed thereon (step 320) to form the desired media coating composition. According to one exemplary embodiment, additives such as surfactants can be incorporated into the liquid coating composition to enhance uniform wetting/coating of the substrate. Once the desired media coating composition is formed on the desired substrate, a desired object may be printed thereon, as will be described in detail below with reference to FIG. 4.

Exemplary System

Figure 4:
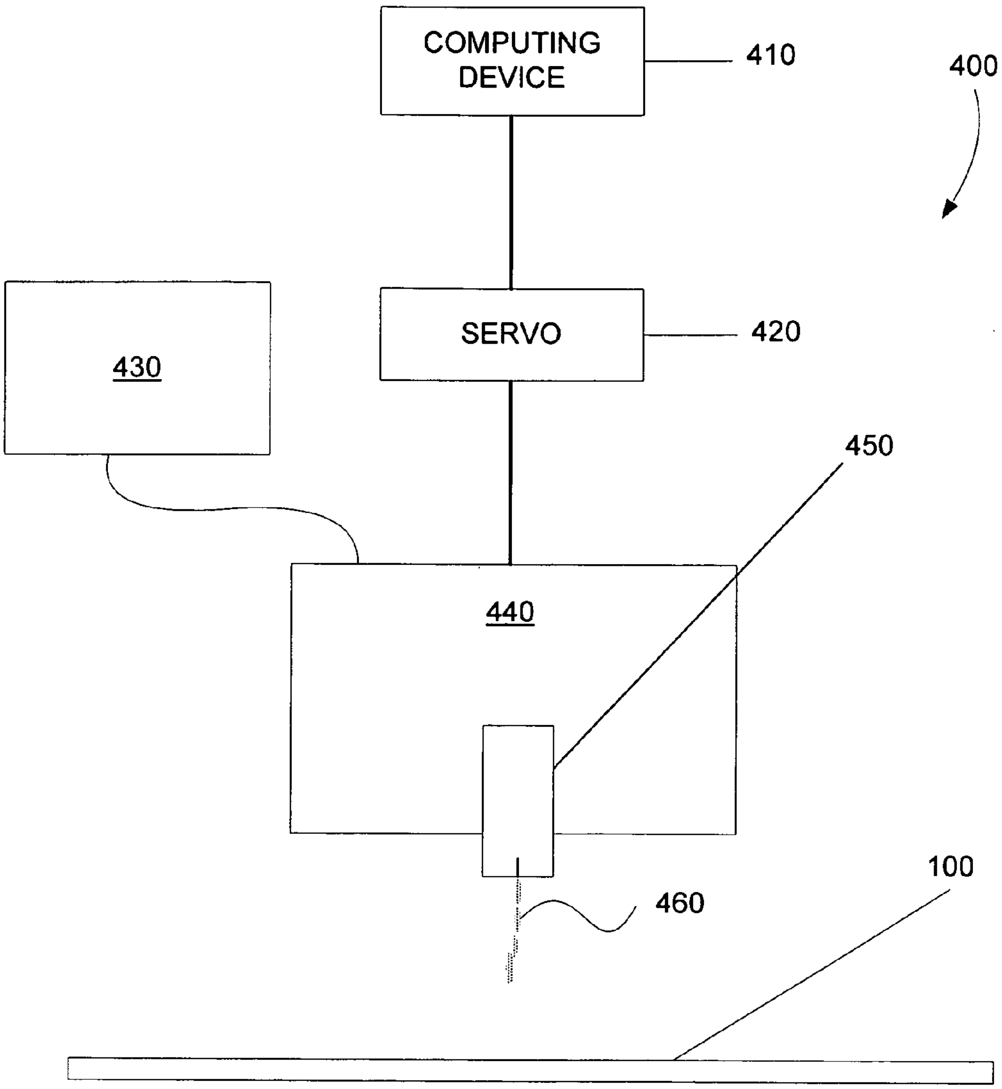
FIG. 4 is a simple block diagram illustrating an inkjet material dispensing system, according to one exemplary embodiment.

FIG. 4 illustrates an exemplary inkjet printing system (400) configured to form a desired object on the above-mentioned exemplary porous inkjet material substrate. As shown in FIG. 4, the present exemplary inkjet printing system (400) includes a computing device (410) controllably coupled through a servo mechanism (420) to a moveable carriage (440) having an inkjet dispenser (450) disposed thereon. A material reservoir (430) is coupled to the moveable carriage (440), and consequently, to the inkjet print head (450). A number of rollers (480) or other transport medium may be located adjacent to the inkjet dispenser (450) configured to selectively position the ink receiving substrate (100). The above-mentioned components of the present exemplary system (400) will now be described in further detail below.

The computing device (410) that is controllably coupled to the servo mechanism (420), as shown in FIG. 4, controls the selective deposition of an inkjet ink (460) on an ink receiving substrate (100). A representation of a desired image or text may be formed using a program hosted by the computing device (410). That representation may then be converted into servo instructions that are then housed in a processor readable medium (not shown). When accessed by the computing device (410), the instructions housed in the processor readable medium may be used to control the servo mechanisms (420) as well as the movable carriage (440) and inkjet dispenser (450). The illustrated computing device (410) may be, but is in no way limited to, a workstation, a personal computer, a laptop, a digital camera, a personal digital assistant (PDA), or any other processor containing device.

The moveable carriage (440) of the present exemplary inkjet printing system (400) is a moveable material dispenser that may include any number of inkjet material dispensers (450) configured to dispense the inkjet ink (460). The moveable carriage (440) may be controlled by a computing device (410) and may be controllably moved by, for example, a shaft system, a belt system, a chain system, etc. making up the servo mechanism (420). As the moveable carriage (440) operates, the computing device (410) may inform a user of operating conditions as well as provide the user with a user interface.

As a desired image or text is printed on the ink receiving substrate (100), the computing device (410) may controllably position the moveable carriage (440) and direct one or more of the inkjet dispensers (450) to selectively dispense an inkjet ink at predetermined locations on the ink receiving substrate (100) as digitally addressed drops, thereby forming the desired image or text. The inkjet material dispensers (450) used by the present exemplary inkjet printing system (400) may be any type of inkjet dispenser configured to perform the present method including, but in no way limited to, thermally actuated inkjet dispensers, mechanically actuated inkjet dispensers, electrostatically actuated inkjet dispensers, magnetically actuated dispensers, piezoelectrically actuated dispensers, continuous inkjet dispensers, etc. Additionally, the present ink receiving substrate (100) may receive inks from non-inkjet sources such as, but in no way limited to, screen printing, stamping, pressing, gravure printing, and the like.

The material reservoir (430) that is fluidly coupled to the inkjet material dispenser (450) houses and supplies an inkjet ink (460) to the inkjet material dispenser. The material reservoir may be any container configured to hermetically seal the inkjet ink (460) prior to printing.

According to the present exemplary embodiment, the inkjet ink (460) contained by the reservoir (430) may include, but is in no way limited to, pigment-based and dye-based inkjet inks. Appropriate dye-based inks include, but are in no way limited to anionic dye-based inks having water-soluble acid and direct dyes. Similarly, appropriate pigment-based inks include both black and colored pigments. Moreover, the inkjet ink compositions of the present exemplary systems and methods are typically prepared in an aqueous formulation or liquid vehicle that can include, but is in no way limited to, water, cosolvents, surfactants, buffering agents, biocides, sequestering agents, viscosity modifiers, humectants, binders, and/or other known additives.

FIG. 4 also illustrates the components of the present system that facilitate reception of the inkjet ink (460) onto the ink receiving substrate (100). As shown in FIG. 4, a number of positioning rollers (480) may transport and/or positionally secure an ink receiving substrate (100) during a printing operation. Alternatively, any number of belts, rollers, substrates, or other transport devices may be used to transport and/or positionally secure the ink receiving substrate (100) during a printing operation, as is well known in the art.

EXAMPLES

The following examples illustrate a number of embodiments of the present systems and methods that are presently known. However, it is to be understood that the following are only exemplary or illustrative of the application of the principles of the present systems and methods. Numerous modifications and alternative compositions, methods, and systems may be devised by those skilled in the art without departing from the spirit and scope of the present systems and methods. The appended claims are intended to cover such modifications and arrangements. Thus, while the present systems and methods have been described above with particularity, the following examples provide further detail in connection with what are presently deemed to be the acceptable embodiments.

Example 1

Synthesis of Compositions with Guanidine Silanes (S-1)

According to one example, a reaction flask equipped with a condenser, thermometer, mechanical stirrer and heating mantle was charged with 3-aminopropyltrimethoxysilane (35.6 g, 0.2 mole), cyanamide (8.41 g, 0.2 mole) and 250 ml of n-butanol. The reaction slurry was then heated to reflux at 120° C. for approximately 8-12 hours. After being heated to reflux for the afore-mentioned time, butanol was removed with a rotor evaporator. The viscous residue within the reaction flask was then dissolved in methanol, and the desired compositions with guanidine silanes (S-1) were precipitated from 1000 liters of acetone as a white hygroscopic solid in 85% yield.

Example 2

Synthesis of Compositions with Biguanidine Silanes (S-22)

Similar to the example 1, compositions with biguanidine silanes (S-22) were produced. Specifically, a complex $C_4H_8N_8CuSO_4$ (I) was synthesized from dicyandiamide by reaction with cupric sulfate at 60° C. for approximately 1.5 h. Once reacted with the cupric sulfate, 3-aminopropyltrimethoxysilane was added into the reaction mixture in two substantially equal portions approximately one hour apart. After reacting at 70° C. to 80° C. for approximately 10 hours, biguanidine silane (S-22) sulfates were obtained in 85% yields. The structures of the title compounds were characterized by EA, IR, NMR and UV.

Example 3

Synthesis of Compositions with Biguanidine Silanes (S-26)

Similar to Example 2 above, compositions with biguanidine silanes (S-26) were synthesized in a reaction flask equipped with a condenser, thermometer, mechanical stirrer and heating mantle. The reaction flask was charged with 3-aminopropyltrimethoxysilane (71.2 g, 0.4 mole), sodium dicyanamide (17.8 g, 0.2 mole), and 250 ml of n-butanol. Once charged, the reaction slurry was then heated to reflux at 120° C. for approximately 8-12 hours. After heating, butanol was removed with a rotor evaporator. The remaining viscous residue inside the reaction flask was then dissolved in methanol and the desired biguanidine silane (S-26) was precipitated from 1000 liters of acetone as a white hygroscopic solid in 90% yield.

After generation of the above-mentioned compositions, a number of porous inkjet mediums were prepared. Fumed silica of surface area from approximately 100 to 400 $m^2/g$ was used for the preparation of the porous inkjet medium, preferably from 200 to 300 $m^2/g$. The fumed silica was dispersed in water to form a stable silica dispersion with a high shear device, such as a rotor-stator. The silane coupling agents mentioned above were then added to the silica dispersion with shearing. The mixture of silica and silane coupling agents were then heated to from 50° C. to 90° C. for up to approximately 3 hours to complete the reaction between the silica and silane coupling agents. The cationic silica obtained by this method was then mixed with a binder (PVA), a cross-linker (boric), a plasticizer (glycerol), a surfactant (Olin 10G), and other additives to form the coating fluids for the porous inkjet recording material.

Example 4

Treatment of Cab-O-Sil MS-55 with S-1 (Post Method)

In one example, a coating fluid was formed by dispersing fumed silica Cab-O-Sil MS-55 (from Cabot Chemical Corp.) dispersed in water with a Kady lab rotor/stator. The percent solid was approximately 20.94% and pH was approximately 2.0. The Z-average particle size measured by Malvern's Zetasizer was approximately 120 nm. 200 g of pre-dispersed MS-55 was stirred with a mechanical stirrer and the solution was placed in a sonication bath. 9.32 grams of 20% aqueous solution of S-1 was added drop-wisely to the MS-55 dispersion with high shear at room temperature. Final pH was adjusted to between 4.5 and 5.0 with 1M HCl. The mixture was then heated in a water bath at 70° C. for one hour with stirring. The mixture was cooled to room temperature and filtered through a 500 mesh sieve. The isoelectric point of the resulting coating fluid as measured by a Malvern Zetasizer was 8.3.

Example 5

Coating Formulation and Coating 137 g of silica dispersion prepared in Example 4 was mixed with 0.7 g of boric acid, 0.28 g of thiodiethanol, 2.81 g of Silwet L-7600 (5% solution), and 17.6 g of D.I. Water. The mixture was stirred with a propeller stirrer in a 45° C. water bath until the mixture became homogenous. 41.54 g of Poval 235 (trademark of Kuraray Chemical Company) solution (11% solid) was added to the mixture with stirring. The stirring was continued for 20 minutes. The viscous solution was then filtered through a 200 mesh sieve to remove gel particles. The viscosity of the solution was approximately 120 cps at 40° C. The percent solid was 17%. Once generated, the solution was coated on a photobase paper with a #120 mylar bar and dried with a hair dryer to give a glossy porous coating. The coatweight of the solution was about 30 grams per square meter (GSM).

Example 6

Testing

A test image was printed on the medium generated in Example 5 with an HP Deskjet 6540 printer and the image was subjected to the test list illustrated in Table 3. As illustrated by the results listed in Table 3, it was discovered that the silica treated with the guanidine and biguanidine silane coupling agents have superior performance than the silica treated with 3-aminopropyltrimethoxysilane.

The results illustrated in Table 3 below were generated based on a 1-5 scale wherein a 5 indicates best or superior properties and a 1 indicates the worst or otherwise poor properties.

According to Table 3, the soaking test included printing an image and allowing the image to dry for four hours and soak the image in water for one hour. After the soaking period, the image was visually inspected for image distortion and damage.

The drop evaporation test performed to generate the results in Table 3 included printing an image and allowing the image to dry for approximately four hours. Once dried, a drop of water was place on the image and allowed to dry overnight. After drying, the images were visually inspected for color smearing.

The humid bleed and colorshift test used to generate the results illustrated in Table 3 include printing a desired image and allowing the printed image to dry overnight. Once dried, the image was placed in a 30° C./80% RH chamber for 4 days. Line width broadening and colorshift on gray were then recorded.

Lastly, the stacking bleed and colorshift test used the generate the data in Table 3 included printing a desired image and, immediately after the image was printed, the image was covered with a photobase paper and 20 sheets of plain paper. 16 hours later, the covering materials were removed and color bleed and colorshift were measured.

TABLE 3

Comparison of Inkjet Media Made from S-22 and 3-Aminopropyltrimethoxy Silane (Silquest A-1110 by GE Silicone)

| Test | Type of Silane: S-22 | Type of Silane: Silquest A-1110 |
|---|---|---|
| Water Soaking Test | 5 | 3 |
| Water Drop Evaporation Test | 5 | 3 |
| Humid Bleed Test | 5 | 4 |
| Humid Colorshift Test | 4 | 3 |
| Stacking Bleed Test | 5 | 4 |
| Stacking Colorshift Test | 4 | 3 |

As illustrated in Table 3, the silica treated with the guanidine and biguanidine silane coupling agents have superior performance than the silica treated with 3-aminopropyltrimethoxysilane. Particularly, the silica treated with the guanidine and biguanidine silane coupling agents exhibit excellent water fastness, water drip fastness, humid bleed, humid color shift, stacking bleed, stacking color shift, and stacking haze characteristics. Specifically, reduced image distortion, bleed, and color shift were observed with the silica treated with the guanidine and biguanidine silane coupling agents, when compared to more traditional silica treated with 3-aminopropyltrimethoxysilane.

In conclusion, the porous ink recording material formed by the above-mentioned systems and methods includes organic modified silica prepared by a reaction between a dispersion of inorganic particulates and silane coupling agents containing guanidine and biguanidine functional groups. The resulting porous ink recording materials exhibited excellent water fastness, water drip fastness, humid bleed, humid color shift, stacking bleed, stacking color shift, and stacking haze characteristics.

The preceding description has been presented only to illustrate and describe exemplary embodiments of the present system and method. It is not intended to be exhaustive or to limit the system and method to any precise form disclosed. Many modifications and variations are possible in light of the above teaching. It is intended that the scope of the system and method be defined by the following claims.

What is claimed is:

1. An ink receiving substrate comprising:

a support layer; and an organic modified silica layer dispensed on at least one surface of said support layer;

wherein said organic modified silica layer includes silica particulates and silane coupling agents having guanidine or biguanidine functional groups.

2. The ink receiving substrate of claim 1, wherein said silane coupling agents comprises from approximately 0.1 to 30% by weight of said silica particulates and silane coupling agent constituents of said organic modified silica layer.

3. The ink receiving substrate of claim 1, wherein said silane coupling agent has the general structure of at least one of:

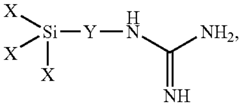

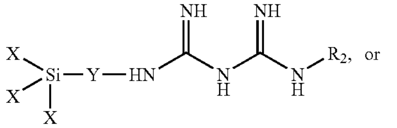

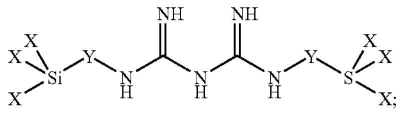

where at least one of X is a halogen, alkoxy, or hydroxy group configured to attach to inorganic particulates;

Y is a linking group containing from 1 to 20 carbons; and $R_2$ is hydrogen or a $C_1$ to $C_{10}$ alkyl group.

4. The ink receiving substrate of claim 3, wherein said silane coupling agent has the structure of at least one of:

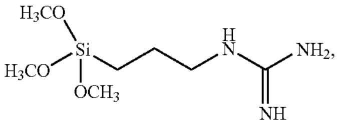

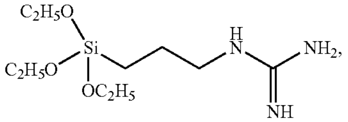

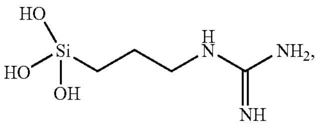

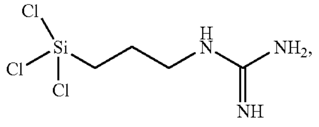

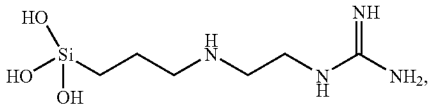

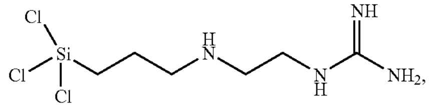

-continued

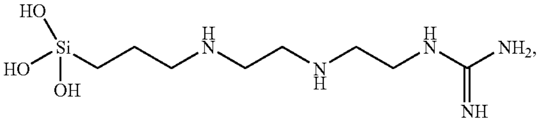

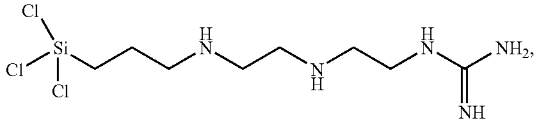

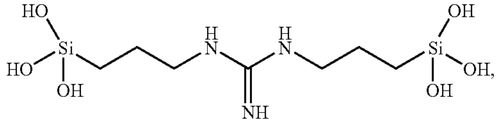

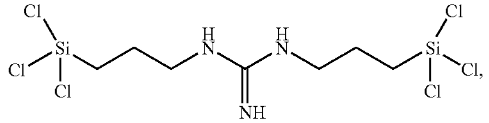

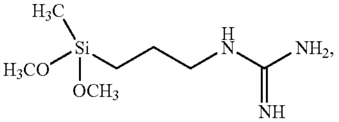

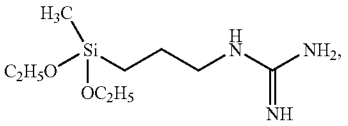

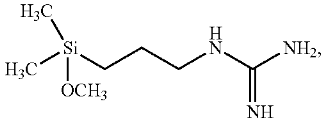

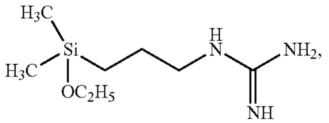

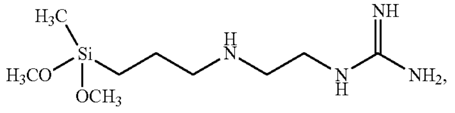

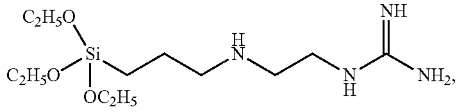

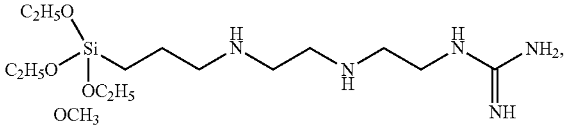

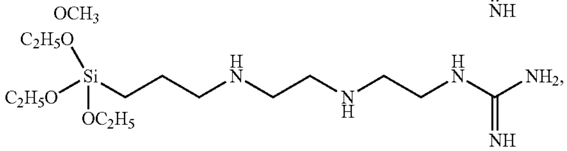

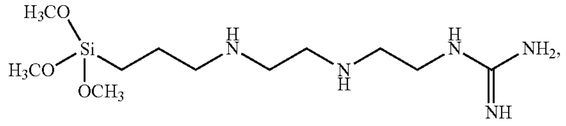

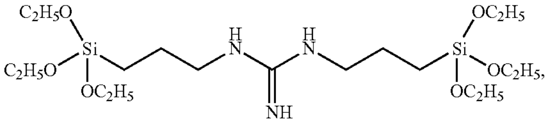

-continued

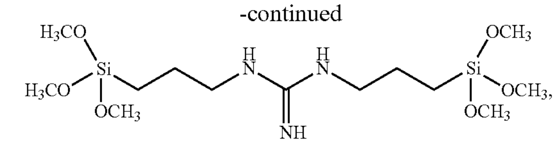

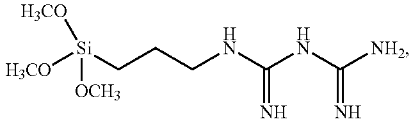

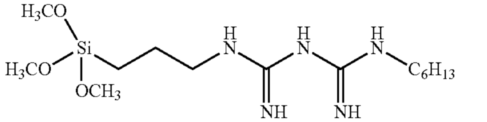

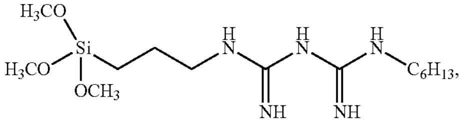

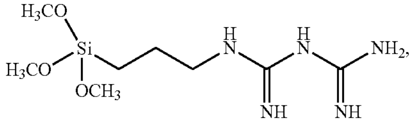

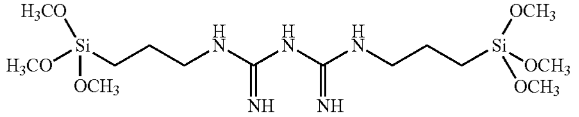

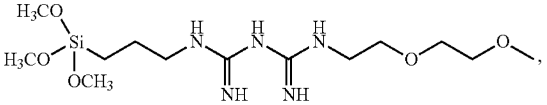

or

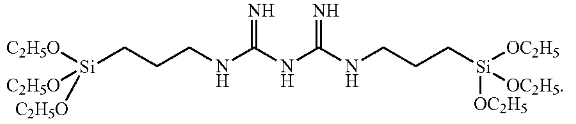

5. The ink receiving substrate of claim 1, wherein said organic modified silica layer comprises a thickness of between approximately 2 μm to about 60 μm.

6. The ink receiving substrate of claim 1, wherein said silica particulates comprise one of a fumed silica or a colloidal silica.

7. The ink receiving substrate of claim 6, wherein said fumed silica is distributed between approximately 10 and 50 grams per square meter.

8. The ink receiving substrate of claim 6, wherein an aggregate size of said fumed silica is between approximately 50 to 300 nm.

9. The ink receiving substrate of claim 6, wherein surface area of said fumed silica is between approximately 100 to 500 square meter per gram of silica.

10. The ink receiving substrate of claim 1, wherein said support layer comprises one of an opaque photographic, a coated paper, a cast coated paper, a clear film, or a plain paper.

11. The ink receiving substrate of claim 10, wherein said clear film comprises one of a cellulose ester or a polyester.

12. The ink receiving substrate of claim 10, wherein said opaque photographic material comprises one of a baryta paper, a polyethylene-coated paper, or a voided polyester.

13. A method for forming an ink receiving substrate comprising:

providing a support layer; and dispensing a layer of an organic modified silica on at least one surface of said support layer;

wherein said organic modified silica layer includes silica particulates and silane coupling agents containing guanidine or biguanidine functional groups.

14. The method of claim 13, wherein dispensing a layer of an organic silica on at least one surface of said support layer comprises:

dispersing said silica particulates in an aqueous environment to form an aqueous dispersion;

dispersing and reacting said inorganic particulates and said silane coupling agents containing guanidine or biguanidine functional groups to form the layer of said organic modified silica.

15. The method of claim 14, wherein dispensing an organic modified silica layer on at least one surface of said support layer comprises:

dispersing said silane coupling agents containing guanidine or biguanidine functional group in an aqueous environment to form an aqueous solution; and dispersing and reacting said inorganic particulates and said silane coupling agents containing guanidine or biguanidine functional group to form a layer of said organic modified silica.

16. The method of claim 15, further comprising coating said organic modified silica onto at least one surface of said support layer.

17. The method of claim 15, further comprising heating said aqueous environment to between approximately 25 and 90° C.

18. The method of claim 15, wherein dispensing an organic modified silica layer on at least one surface of said support layer comprises:

coating said support layer with silica particulates;

dispersing said coupling agents with guanidine or biguanidine functional groups in an aqueous environment to form a liquid coating composition; and dispensing said liquid coating composition onto said inorganic particulate layer.

19. The method of claim 18, further comprising dispersing one of a surfactant, a co-solvent, a buffer, a biocide, a viscosity modifier, a sequestering agent, a stabilizing agent, or water into said liquid coating composition.

20. A system for printing inkjet images with reduced yellowing comprising:

a media sheet including a porous coating composition including organic modified silica having silica particulates and silane coupling agents having guanidine or biguanidine functional groups, and a media substrate having the porous coating composition coated thereon;

an inkjet material dispenser configured to dispense an inkjet ink onto said media sheet; and an inkjet ink fluidly coupled to said inkjet material dispenser.

21. The system of claim 20, wherein said silane coupling agents have the general structure of at least one of:

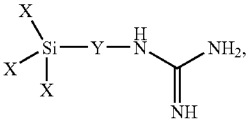

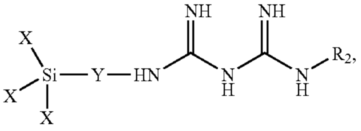

or

-continued

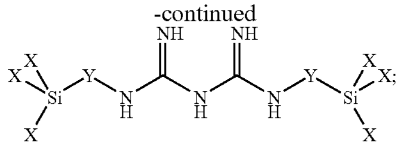

where at least one of X is a halogen, alkoxy, or halide group configured to attach to inorganic particulates;

Y is a linking group containing from 1 to 20 carbons; and $R_2$ is hydrogen or a $C_1$ to $C_{10}$ alkyl group.

22. An ink receiving substrate comprising:

a support layer; and an organic modified metal oxide or semi-metal oxide layer dispensed on at least one surface of said support layer;

wherein said organic modified metal oxide or semi-metal oxide layer includes inorganic particulates and silane coupling agents having guanidine or biguanidine functional groups, and wherein said inorganic particulates comprise one of a fumed silica, a colloidal silica, a fumed alumina, a boehmite, a pseudo-boehmite, a colloidal aluminum oxide.

* * * * *